July 13, 1954 V. GEORGEFF 2,683,825
EDDY-CURRENT CLUTCH MOUNTING MEANS
Filed Sept. 12, 1952 2 Sheets-Sheet 2
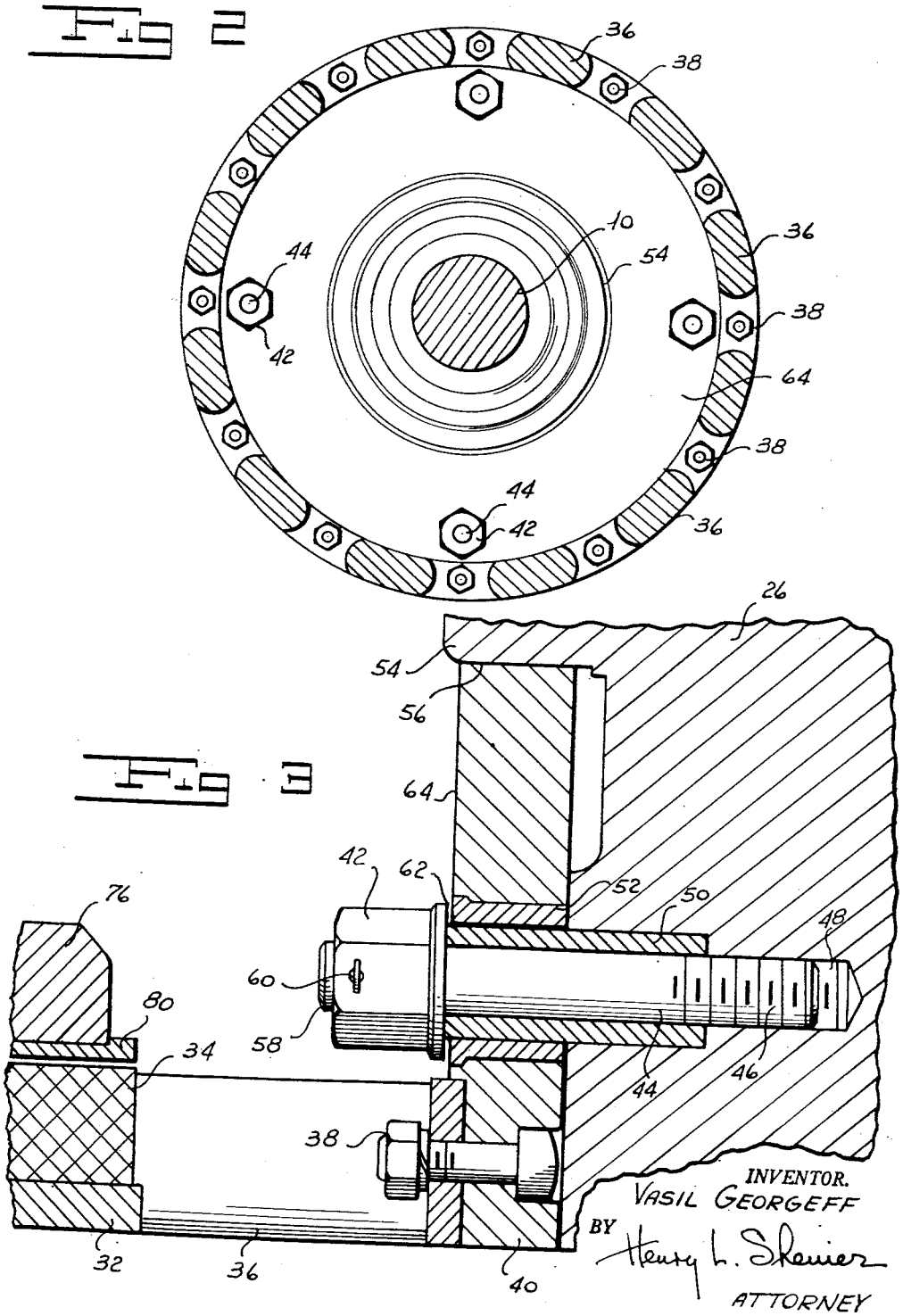
INVENTOR.
VASIL GEORGEFF
BY Henry L. Skewes
ATTORNEY Patented July 13, 1954

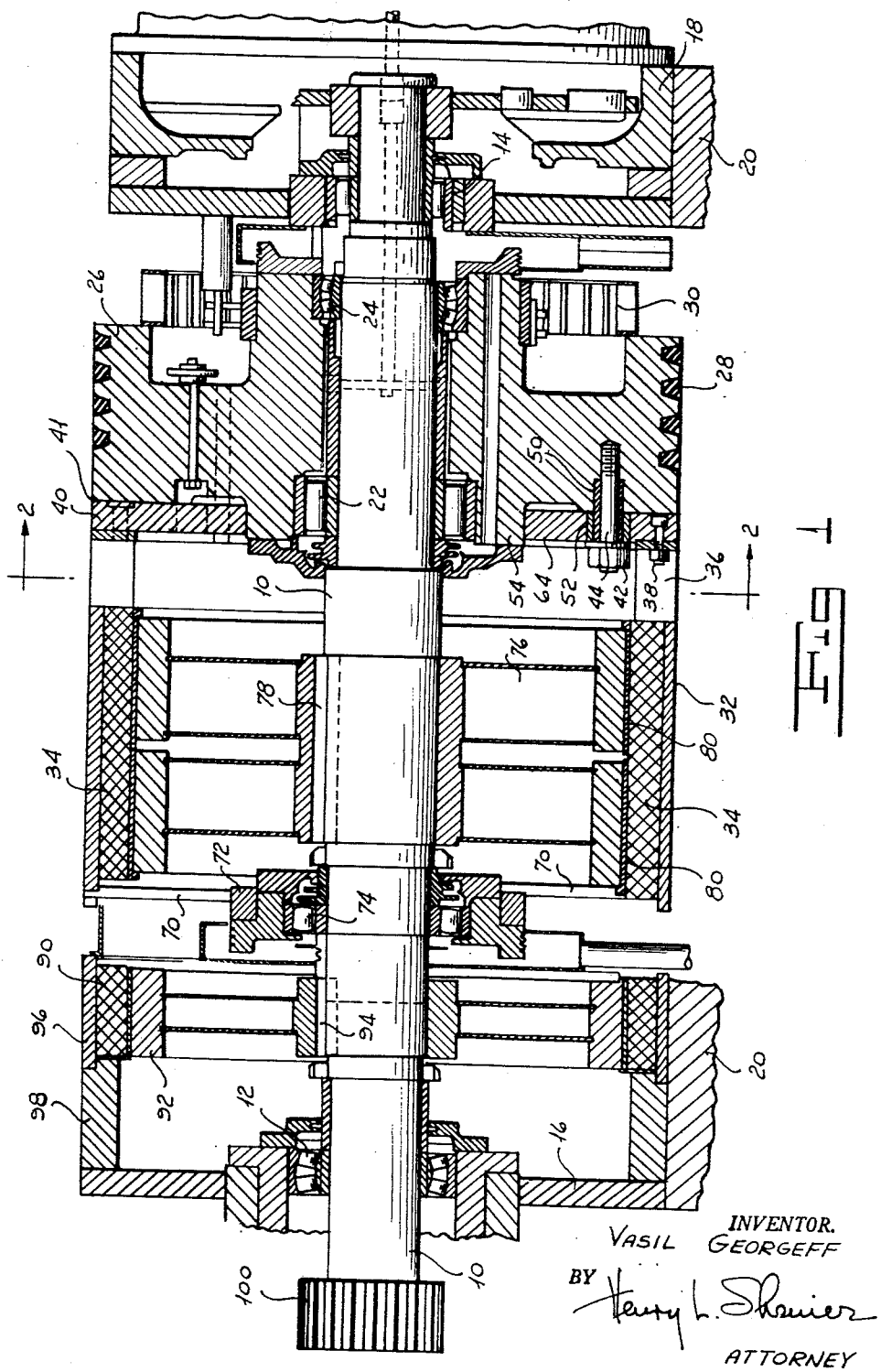

2,683,825

UNITED STATES PATENT OFFICE 2,683,825

EDDY-CURRENT CLUTCH MOUNTING MEANS

Vasil Georgeff, La Grange Park, Ill., assignor to Danly Machine Specialties, Inc., Chicago, Ill., a corporation of Illinois Application September 12, 1952, Serial No. 309,308

5 Claims. (Cl. 310—96)

My invention relates to an eddy-current clutch mounting means and more particularly to the assembly of an eddy-current clutch with the flywheel of a power press.

Eddy-current clutches are frequently used with power presses. These clutches are known to the art and may advantageously be of the type made by the Dynamatic Corporation of Kenosha, Wisconsin. Eddy-current clutches are essentially eddy-current coupling devices and offer many advantages. The coupling is substantially an eddy-current generator in which both the armature and the field rotate. Eddy currents are generated by the relative motion between the two members, the torque being developed between opposite magnetic areas. A press fitted with eddy-current clutches will start and stop smoothly and a wide control of speed and torque may be obtained in a relatively simple manner. Since they do not employ friction surfaces and rely on energy transfer on the medium of an electromagnetic induction, they ordinarily are easy to maintain and the absence of friction surfaces eliminates wear. Then, too, the electromagnetic coupling principle cushions the transfer of energy, thus minimizing torsional strains and shocks. Their operation is quiet.

In spite of all the advantages presented by eddy-current clutches, one serious disadvantage is present. In order that they may operate efficiently, a comparatively small air gap must exist between the rotor and the stator of the coupling. In a typical case, the air gap is .035 of an inch. In an illustrative construction, for example, the field winding comprising the stator is attached to the flywheel of the power press and constantly rotates therewith. The flywheel is mounted on a shaft which is supported by two bearings carried by the frame of the press either directly or through pillar blocks. The flywheel is customarily fitted with a pair of bearings and the housing for the stator winding is fitted with a bearing. Secured to the shaft within the field is the rotor adapted to be coupled to the rotating clutch field when the field is energized. The shaft, therefore, carries between two bearings a rotating assembly comprising the flywheel and the rotating stator field of the clutch device. Aside from the difficulty to align three bearings, we are faced with the fact that the shaft itself has an inherent flexibility. The weight of the rotating parts is such that they tend to bow the shaft. The deflection of the shaft will cause a decreased gap on one side and an increased air gap on the other side. This eccentricity in the air gap produces heating. This bowing always introduces abnormal wear on the center of the three bearings. As the center bearing wears, the inherent flexibility of the shaft on which the three bearings are mounted permits the shaft to bow slightly. This further reduces the air gap between the field and the rotor of the clutch. After this wear has proceeded a sufficient amount, metal-to-metal contact between the rotor inductors and the field housing occurs, resulting in injury to the equipment. Furthermore, besides extreme damage to the equipment, an accidental operation of the press may occur when this condition exists, which may result in serious or fatal injury to operating personnel. Then, too, if the press is part of a production line, the breakdown of the press represents a further serious financial loss.

One object of my invention is to provide an eddy-current clutch mounting for use with power presses in which the field housing is flexibly secured to the flywheel in order to avoid abnormal wear of the center bearing.

Another object of my invention is to provide an eddy-current clutch mounting means for power presses in which no loss in air gap will be experienced through abnormal wear.

Other and further objects of my invention will appear from the following description.

In the accompanying drawings which form part of the instant specification and which are to be read in conjunction therewith and in which like reference numerals are used to indicate like parts in the various views:

Figure 1 is a sectional elevation of a portion of a power press equipped with an eddy-current clutch mounting containing one embodiment of my invention.

Figure 2 is a sectional view taken on the line 2—2 of Figure 1.

Figure 3 is an enlarged sectional view of a portion of Figure 1, showing details of my improved eddy-current clutch mounting means.

In general, my invention contemplates securing the field housing for the eddy-current clutch to the flywheel for rotation therewith in a manner to permit the differential relative longitudinal movement between parts of the flywheel and the field housing. In this manner if there is any bowing or deflection of the shaft on which the parts are mounted, no abnormal wear of the center bearing of the mounting assembly will occur. If the field winding is bolted rigidly to the flywheel, as is the practice in the prior art, the press shaft on which the assembly is mounted tends to remain straight, but increased stresses and abnormal wear of the center bearing invariably results. By providing a flexible coupling arrangement no loss in torque is experienced, and the center bearing is not employed to tend to keep the mounting shaft straight, thus eliminating undue pressure and abnormal wear in the center bearing. This, I have found, eliminates the difficulty and prevents the loss of air gap with the attendant disastrous results. After a test of a press equipped with an eddy-current clutch mounting means embodying my invention under load conditions for over six months I could detect no loss of air gap after repeated progressive measurements. In this construction of the prior art an appreciable loss of air gap under the same conditions of test is uniformly noted.

More particularly referring now to the drawings, the drive shaft 10 of the press is mounted for rotation upon bearings 12 and 14 carried by pillar blocks 16 and 18, which are in turn mounted upon the press frame 20. Rotatably mounted upon shaft 10 on bearings 22 and 24 is the flywheel 26, which is continuously driven by a motor (not shown) in any appropriate fashion, as for example by V-belts 28 adapted to seat in grooves formed in the periphery of the flywheel, as is well known to the art. The flywheel bearings are provided with a lubricating system which forms no part of the instant invention. The flywheel may have secured thereto a centrifugal fan 30 for providing cooling air in a system which forms no part of the instant invention.

A housing 32 is adapted to support the field winding 34 of the eddy-current clutch. Formed integrally with the housing are a plurality of extensions 36 which are securely bolted by means of bolts 38 to an annular plate 40. The annular plate 40 is secured to the flywheel 26 by nuts 42 threaded upon studs 44. The inner ends of the studs 44 are provided with screw threads 46 coacting with an internally threaded portion 48 formed in the flywheel 26. A sleeve 50 surrounds each stud 44. A bushing 52 is seated within openings in the annular plate 40. A cylindrical boss 54 is formed around the center of the flywheel and the inner periphery 56 of the annular plate 40 is seated about this boss. The nut 42 is secured to the threaded end 58 of the stud 44 of a cotter pin 60 such that the base surface 62 of the nut 42 is spaced from the surface 64 of the annular plate 40 through a small distance, say one thirty-second of an inch. The plate, therefore, is free to move axially of the axis of rotation of the flywheel but is constrained to rotate with the flywheel through the studs 44. There is sliding engagement between a bushing 52 and the sleeve 50 and there is sliding engagement between the boss 54 and the surface 56. The field housing 32 is provided with a plurality of spider arms 70 terminating in a hub 72 which is carried by a bearing 74 mounted upon the shaft 10. It will be seen that we have three bearings, 74, 22 and 24, which, in the construction of the prior art, must be in perfect alignment. The rotor 76 of the eddy-current clutch is keyed by key 78 to the shaft 10 for rotation therewith. The rotor carries a plurality of inductor bars 80 in which the eddy currents are generated whenever the field 34 is energized, and the flywheel causes the field 34 to move relative to the inductor bars 80. The induced currents in the inductor bars carry the rotor 76 around, thus rotating the shaft. The air gap between the field winding 34 and the inductor bars 80 must be small if the eddy-current clutch is to be at all efficient. In a typical case, this air gap will have a dimension of .035 of an inch. The rotor 76, it will be seen, is carried by the shaft 10. The field housing 32 and its associated winding 34 is carried in part by the bearing 74 and in part by the flywheel bearings 22 and 24. The flywheel itself is carried by the last two bearings. All of the bearings in turn are carried by the shaft 10. The flywheel, in a typical case, may weigh five tons, while the eddy-current clutch parts may weigh two tons. Thus we see that there is a weight of seven tons suspended on shaft 10 between the two bearings 12 and 14. This weight tends to deflect the shaft, or bow it, slightly. It will be readily appreciated that if the clutch housing 32 were rigidly bolted to the flywheel, this tendency would be reduced and the thrust transmitted to the center bearing 22 increased. This increased thrust causes excessive and abnormal wear of the center bearing 22. When the center bearing wears, the shaft will then be free to deflect under the load and in so doing reduce the air gap, and when the wear is of sufficient extent, may cause several extremely deleterious effects. The stator and the rotor of the clutch may lock due to the loss of the air gap. This will cause an accidental operation of the press, with its attendant dangers. First, there is the danger of serious or fatal injury to the personnel operating the press. Then, too, if this occurs during a feeding operation before the stock is in position, or during a period of die adjustment, extreme damage to the press will be caused. Furthermore, the eddy-current clutch will be seriously injured whenever locking occurs.

By means of my eddy-current clutch mounting assembly I relieve the undue stress upon the center bearing and thus eliminate the abnormal wear on it which occurs in constructions of the prior art. The deflection is so slight that both the field housing with its field and the rotor of the eddy-current clutch do not move relative to each other, even though the shaft 10 is slightly deflected or bowed under the weight which it supports. In this bowing movement the annular plate 40 moves away from the flywheel surface slightly at the top portion indicated by the reference 41 in Figure 1. The plate is permitted to skew slightly by the space provided between the bottom surfaces 62 of the nuts 42 and the surface of the annular plate 40, the plate sliding supported by its bushings 52, with respect to the sleeves 50. By relieving the pressure upon the center bearing and permitting the shaft to seek its natural shape under the load, all abnormal wear on the center bearing is eliminated and the air gap constantly maintained over long periods of time.

A second field winding 90 is shown in Figure 1 cooperating with a second rotor 92 which is keyed to the shaft by key 94. The field winding 90 is supported in the housing 96 which is rigidly carried by the press frame 98. Whenever the winding 90 is energized, a braking action occurs. In the normal operation of the eddy-current clutch assembly the brake field winding is energized wholly or in part whenever the clutch field winding 34 is energized in whole or in part.

A pinion 100 carried by the shaft 10 for rotation therewith meshes with the driving gear train of the press, as is well known in the art.

It will be seen that I have accomplished the objects of my invention. I have provided an eddy-current clutch mounting for use with power presses in which the field housing is flexibly secured to the flywheel for axial motion with respect thereto but longitudinally secured to the flywheel for rotation therewith. I have provided an eddy-current clutch mounting means in which no loss of air gap will be experienced through abnormal wear whereby to avoid the dangers accompanying the loss of the air gap between the eddy-current clutch stator and the eddy-current clutch rotor.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is further to be understood that my invention is not to be limited to the specific details shown and described.

Having thus described my invention, what I claim is:

1. In an eddy-current clutch assembly for power presses, a frame, a shaft, means for rotatably supporting the shaft on the frame, a flywheel, a pair of bearings carried by the shaft for rotatably supporting the flywheel thereon, an eddy-current clutch having an eddy-current member and a field member, a third bearing carried by the shaft, means for supporting one end of the field member on said third bearing, yieldable means carried by the flywheel for rotation therewith and axial movement with respect thereto for supporting the other end of the field member and means for supporting the eddy-current member on the shaft for rotation therewith.

2. An eddy-current clutch assembly as in claim 1 in which said flywheel is formed with a central boss and said yieldable means comprises an annular plate mounted on said boss, means for securing the plate to the flywheel for rotation therewith while permitting a limited axial movement of said plate with respect to the flywheel and means for securing the other end of the field member to said plate.

3. An eddy-current clutch assembly as in claim 1 in which said flywheel is formed with a boss and said yieldable means includes an annular plate carried by the boss and formed with a plurality of openings, a plurality of studs carried by the flywheel and passing through said plate openings and constraining said plate to rotate with said flywheel, nuts carried by said studs, means for positioning said nuts on said studs spaced from the surface of the plate whereby to permit a limited degree of axial movement of the plate and means for securing the other end of the field member to said plate.

4. An eddy-current clutch assembly as in claim 1 in which said yieldable means includes an annular plate formed with a plurality of openings, axially directed studs carried by the flywheel and passing through said openings, bushings carried by the studs having sliding engagement with the interior peripheries of the openings, means carried by the studs for securing the plate to the flywheel for limited axial movement with respect thereto and means for securing the other end of the field member to said plate.

5. An eddy-current clutch assembly as in claim 1 in which said yieldable means carried by the flywheel includes an annular plate provided with openings, bushings positioned in said openings, axially directed studs carried by the flywheel and passing through said openings, sleeves carried by said studs providing frictional supporting surfaces for said bushings, nuts carried by said studs for securing said annular plate to said studs, said nuts being spacedly positioned from the surface of said plate to provide for limited axial movement of the plate with respect to the flywheel and means for securing the other end of the field member to said plate.

References Cited in the file of this patent

UNITED STATES PATENTS

| Number | Name | Date |
| --- | --- | --- |
| 2,471,505 | Winther | May 31, 1949 |